No. 823,076. PATENTED JUNE 12, 1906.
R. PINSENT.
INFANT SOOTHER.
APPLICATION FILED DEC. 7, 1905.
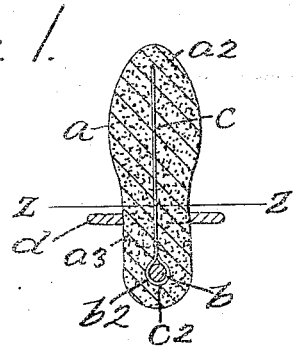
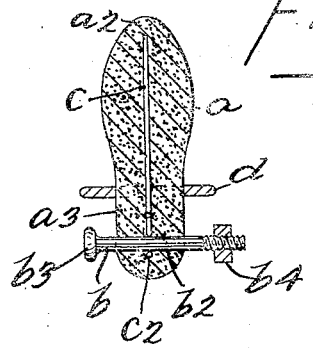
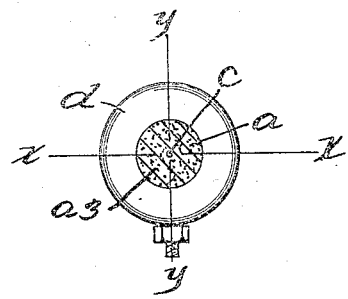
WITNESSES
INVENTOR
Rosina Pinsent
BY Edgar Tate & Co
ATTORNEYS

UNITED STATES PATENT OFFICE.

ROSINA PINSENT, OF TORQUAY, ENGLAND.

INFANT-SOOTHER.

No. 823,076.  Specification of Letters Patent.  Patented June 12, 1906.

Application filed December 7, 1905. Serial No. 290,707.

*To all whom it may concern:*

Be it known that I, ROSINA PINSENT, a subject of the King of Great Britain, residing at Torquay, in the county of Devon, England, have invented certain new and useful Improvements in Infant-Soothers, of which the following is a specification, such as will enable those skilled in the art to which it appertains to make and use the same.

This invention relates to what are known as "infant-soothers;" and the object thereof is to provide a device of this class which is intended as a substitute for the ordinary rubber teat, a further object being to provide a device of the class specified composed of a composition of soluble and nutritious material; and with these and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a longitudinal section of my improved infant-soother, the section being taken on the line $x$ $x$ of Fig. 3; Fig. 2, a longitudinal section on the line $y$ $y$ of Fig. 3, and Fig. 3 a section on the line $z$ $z$ of Fig. 1.

My improved infant-soother comprises a head portion $a$, preferably circular or cylindrical in cross-section and rounded at one end, as shown at $a^2$, and provided with a reduced shank or neck member $a^3$, through the end portion of which is passed a pin or similar device $b$, composed of bone, hard rubber, ivory, or any other suitable material, said end portion of the neck or shank $a^3$ being provided with a transverse opening $b^2$ for this purpose, and said pin $b$ is provided at one end with a head $b^3$ and at the opposite end with a removable nut or similar device $b^4$, and I also preferably place in the head and neck or shank portion $a$ a longitudinally-arranged cord or thread $c$, having at one end a loop $c^2$, through which the pin $b$ is passed, the object of the pin $b$ and the thread or cord $c$ being to prevent the swallowing of the device, and in practice I also preferably connect with the neck or shank portion $a^3$ of the device a disk, plate, or similar device $d$, of any suitable material, which also serves to prevent the soother from being swallowed or being inserted too far into the mouth of the infant.

The soother proper is composed of a soluble composition comprising a suitable gum, isinglass, honey, and sugar and is flavored with caraway or any other desired flavoring material, and other soluble substances may be substituted for the gum, isinglass, and other material, the object in this connection being to provide a soluble soother which will also be nourishing or which is composed of nourishing material, and when gum, isinglass, honey, and sugar are employed the component parts will preferably be in the following proportions: gum, twelve parts; isinglass, three parts; honey, two parts, and sugar three parts.

It will be understood that when the device is dissolved or partially dissolved the pin $b$ and the guard disk or plate $d$ may be detached, and said parts may be connected with another soother comprising the head portion $a$ and the neck or shank $a^3$.

Having fully described my invention, what I claim as new, and desire to secure by Letters Patent, is—

1. An infant-soother, comprising a head portion and a neck or shank portion, said device being composed of soluble material and being provided with a thread which is passed longitudinally and centrally therethrough and a pin passed through the shank portion and with which said thread is connected, substantially as shown and described.

2. An infant-soother, comprising a head portion and a neck or shank portion, said device being composed of soluble material, and being provided with a longitudinally-arranged thread, and the neck or shank portion thereof being provided with a transverse aperture and a removable pin passed therethrough, the neck or shank portion being also provided with a guard disk or plate, substantially as shown and described.

In testimony that I claim the foregoing as my invention I have signed my name, in presence of the subscribing witnesses, this 22d day of November, 1905.

ROSINA PINSENT.

Witnesses:
LEONARD MARK KENNAWAY,
JAMES KNOWLES.